Oct. 27, 1970   C. TERRY   3,536,290
MOLD FOR MAKING MATS
Filed May 9, 1967

INVENTOR.
CHARLES TERRY
BY
Paul A. Weilein
ATTORNEY

United States Patent Office 3,536,290
Patented Oct. 27, 1970

3,536,290
MOLD FOR MAKING MATS
Charles Terry, 754 Hampton Road,
Arcadia, Calif. 91006
Filed May 9, 1967, Ser. No. 637,293
Int. Cl. B41b 11/62
U.S. Cl. 249—103                3 Claims

ABSTRACT OF THE DISCLOSURE

Apparatus and method for making a molded mat or the like from a moldable material, which utilizes a sectionalized mold including a main section having a bottom surface recessed to receive one or more plate inserts to provide an auxiliary mold section, the inserts having one or more upwardly opening mold cavities which singly or cooperatively form letters or other desired indicia which are first molded in situ from a first moldable material. A second moldable material is then molded in the main section overlying the indicia which are bonded thereto. The individual inserts have peripheral edge surface grooves on one or more edges, which cooperate with an abutting edge surface to provide a cavity subtending shear edges so that upon stripping the mat from the mold, the fillets at the joints between the inserts will be stripped or sheared from the mat.

BACKGROUND OF THE INVENTION

The invention pertains to the molding art, and in particular is concerned with the fabrication of mats and similar articles from rubber-like materials, plastic, plastisols or the like so as to provide a body portion with indicia, such as lettering and the like in bas-relief thereon, and which may be of the same or a different color.

Heretofore, it has been generally known to separately construct the lettering or other desired indicia, and then to attach a body to the indicia, the body being either directly molded in position over the indicia, or separately formed and then vulcanized to the indicia.

The prior art is exemplified by Pat. No. 2,968,578, wherein inserts such as letters or other indicia are first separately formed. These pre-formed inserts are then placed in a holding die or dies interchangeably fixed and held positioned in the bottom of the main mold so as to be integrally molded into and locked with the material of the main mat body.

The apparatus and method of procedure as disclosed in the foregoing patent constituted a relatively expensive and time consuming procedure in that separate presses were required for making the inserts, and special molding dies were required for the inserts during the final molding operation.

SUMMARY OF THE INVENTION

The present invention relates generally to a mat and method of making, and is concerned with improvements in the means and the method for molding the letters or other indicia and attaching such indicia to a main mat body so that the letters or other indicia will be formed thereon in bas-relief, and of different colors, if desired.

Having the foregoing in mind, it is one object of the present invention to provide an improved sectionalized mold with a main section for molding the main mat body, and an associated auxiliary section, the latter having variable mold inserts in which desired characters or other indicia may first be molded in situ, and thereafter the main mat body molded in the main mold section in a position directly engaged with the molded inserts to form a composite mat structure with the inserts in bas-relief.

A further object of the herein described invention is to provide an improved more economical method for molding composite mat structures to provide a main mat pattern around an area having characters or indicia in bas-relief therein.

Another object of the invention is to provide mold apparatus of novel construction which will permit the carrying out of the method steps in a single mold by first molding out the desired indicia with a first moldable material, and thereafter molding the main mat body with a second moldable material having bonded engagement with the indicia.

Still another object is to provide as an article of manufacture an improved mold insert for use in a main mold for the molding of desired indicia, these inserts being so constructed that they may be used singly or in multiple to provide the desired indicia.

Further objects of the invention will be brought out in the following part of the specification wherein detailed description is for the purpose of fully disclosing the invention without placing limitations thereon.

BRIEF DESCRIPTION OF THE DRAWINGS

Referring to the accompanying drawings which are for illustrative purposes only.

DESCRIPTION OF THE PREFERRED EMBODIMENT

Figure 1:
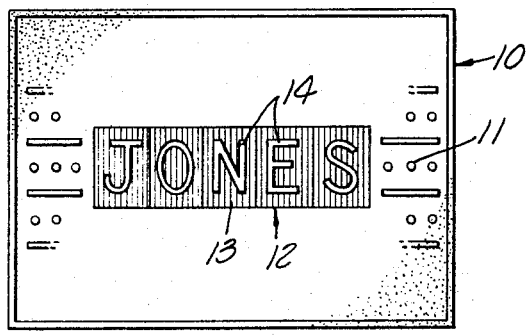
FIG. 1 is a plan view of a mat constructed according to the present invention.

Referring more specifically to the drawings, for illustrative purposes, a mat 10 constructed according to the invention is shown in FIG. 1 as comprising a general surface or background structure which provides a primary mat design pattern 11 of upstanding studs, ribs or other structural formations. This pattern is in surrounding relation to a panel section 12 which contains a secondary design pattern 13 such as ribs or other surface formations to provide a contrasting pattern to that of the primary design pattern. The secondary design surrounds name forming letters 14 or other desired indicia which extend above the surface containing the secondary design pattern so as to be in bas-relief. The letters 14 or other indicia in this area may be of a different color, if desired, than that of the general color of the main mat body.

Figure 2:
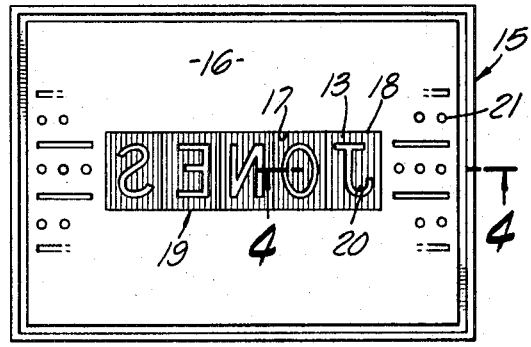
FIG. 2 is a top plan view of a mat mold constructed according to the herein described invention.
Figure 4:
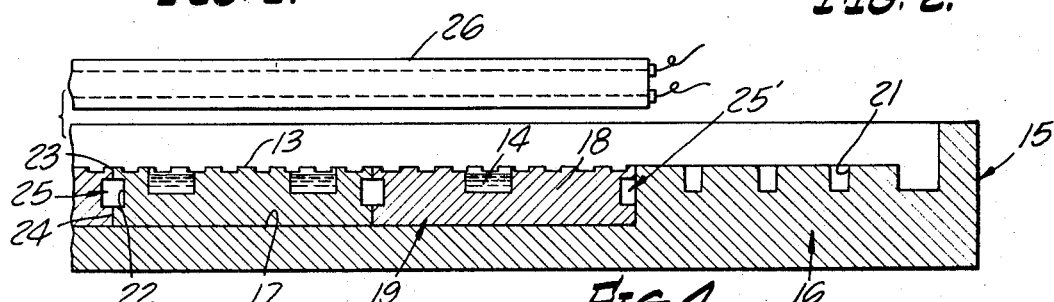
FIG. 4 is an enlarged fragmentary longitudinal section of the mold, taken substantially on the line 4—4 of FIG. 2 and showing detailed arrangement of the associated mold parts.

The mat as shown in FIG. 1, and described above, is formed in a mold 15 as best shown in FIGS. 2 and 4. The mold 15 is sectionalized to provide a main section 16 having a bottom recessed portion 17 for the reception of one or more indicia forming inserts 18 which singly or in combination provide an auxiliary mold section 19 within the main section.

Figure 3:
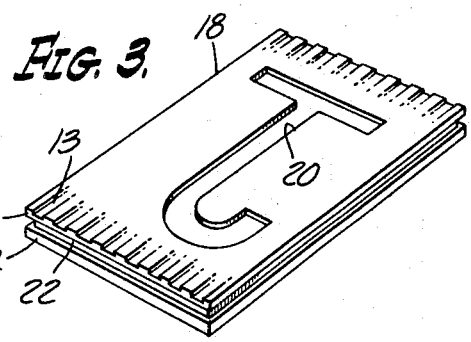
FIG. 3 is an enlarged perspective view of a mold insert as used for forming the mat indicia.

The details of construction of the indicia forming inserts 18 are clearly shown in FIG. 3. These inserts are constructed of preferably a suitable metal such as aluminum. The insert is shown as being of rectangular configuration and is formed as a plate member. The insert has an upper surface containing a milled-out or otherwise formed recess 20 therein to provide a mold cavity which conforms to the configuration of the desired indicia, this cavity being upwardly opening into the upper surface of the insert. It will be observed that the upper surface of the insert is formed to provide a ribbed or other desired configuration which is to form the secondary design pattern 13 which surrounds the indicia forming recess. This secondary pattern will usually be of less height than that of the indicia to be formed within the recess 20, so that the indicia will be in bas-relief to the background secondary pattern. Also, the secondary pattern will usually differ from that of the primary design pattern which surrounds the panel section 12. The primary design pattern will be formed by suitable mold cavities 21 which extend downwardly from open ends lying in the bottom surface of the main mold section. It will be observed that the primary design pattern is not carried into the panel section 12.

The insert plates are provided on one or more or their peripheral edge surfaces with a longitudinally extending groove 22 which is of less width than the total width of the edge surface. Thus, the groove is bordered on opposite sides with marginal edge abutment surface areas 23 and 24 respectively adjacent the upper and lower surfaces of the insert plate. It will be evident from the disclosure in FIG. 4 that, when a grooved abutment edge surface of one insert plate is positioned in the auxiliary mold section, the confronting grooves of the inserts cooperatively define an elongate internal cavity 25. On the other hand, if the grooved edge surface of an insert abuts a non-grooved edge surface, a cavity as shown at 25' will likewise be formed.

The mold structure as hereinabove described is utilized for carrying out the steps of the method according to the present invention in a manner which will now be described in detail. Referring to FIG. 4, the letters or other indicia are first molded by pouring a first moldable material into each of the indicia forming inserts 18 to substantially fill the mold cavity formed by the recess 20 in each case. This moldable material may be one of any number of suitable available materials suitable for this purpose. In the present instance a plastisol made from polyvinyl chloride powder mixed with a suitable plasticizer and other ingredients has been used. The plastisol at the time of molding has a consistency substantially that of light molasses. The material may also contain coloring matter to provide a desired color which may be in contrast to the color generally used for the main body of the mat.

After molding the indicia in the manner explained above, the molded material is then heated in situ for approximately ten to fifteen seconds by subjecting to an appropriate heat source, as generally indicated by the numeral 26 in FIG. 4. While the heat source has in this instance been illustrated as a heating element, it is to be understood that other appropriate heating means may be utilized, for example, an infra-red lamp. This heating step leaves the molded material in the indicia forming cavities in a jelled condition.

A second moldable material, which may be similar to that used for molding the indicia, having a consistency of light molasses, is then poured over the bottom of the main mold and exposed surfaces of the inserts, the second moldable material engaging the exposed surfaces of the indicia with which it makes bonding contact. The second moldable material is brought to the required level so as to substantially fill the main mold, as indicated by the numeral 27 in FIG. 5.

Figure 5:
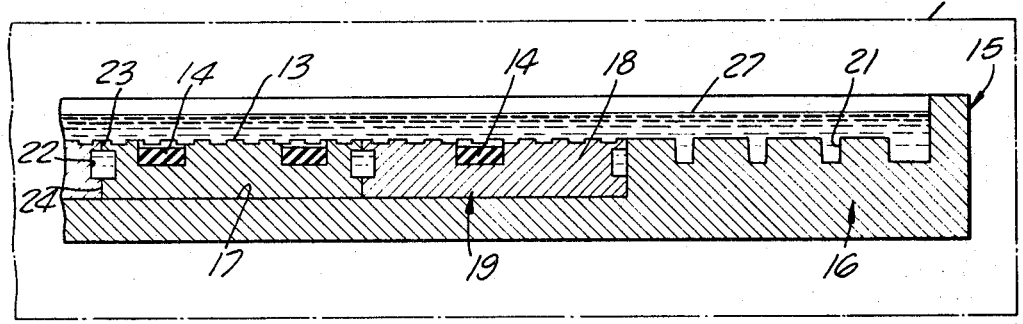
FIG. 5 is a view similar to that of FIG. 4, illustrating the relationship of the molded materials in the mold during the final molding and curing operation.

The mold with the molded indicia and main mat body is then placed in an oven, as schematically indicated in phantom lines by the numeral 28 in FIG. 5, where it is cured at a temperature of approximately 400° F. for a period of approximately six minutes.

At the end of the curing period, the mold with the cured material therein is removed and cooled by suitable means such as refrigeration, cold air, water spray, dipping or the like, until it reaches a temperature of approximately 150° F. At this temperature, the mat is stripped from the mold and is ready for use. As a result of the curing operation, the molded material of the indicia and molded material of the mat body will be integrally bonded at their engaged surfaces so as to provide a composite molded structure, and in the case of a mat, a mat body having the indicia extending in bas-relief.

When the mat is stripped from the mold, no further trimming will be necessary as there will be no fillets along the joint lines between the respective inserts, since these fillets will be automatically removed in a manner which will now be explained.

Figure 6:
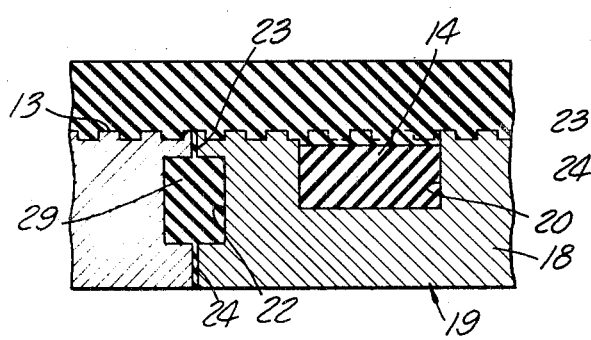
FIG. 6 is an enlarged fragmentary view showing the joined portions of edges of the inserts in section, and the operative effect of the adjacent grooved edges thereof.

Referring to FIG. 6, it will be noted that the internal cavity 25 into which the moldable material may squeeze or pass through the abutting edge surfaces 23—23 of adjacent inserts. The material within the cavity 25, as indicated by the numeral 29, forms in effect a key lock, and when the mat is stripped from the mold, the abutting edge surfaces 23—23 will function as a shear to remove any excess material which might be formed along the joints between the letter-forming inserts, without having to perform an additional trimming operation.

From the foregoing description as applied to the foregoing disclosure, it is believed that it is clearly evident that the delineated objects of the invention will be readily accomplished.

Various modifications may suggest themselves to those skilled in the art without departing from the spirit of the invention, and I do not wish to be restricted to the specific forms as shown or the uses mentioned, except to the extent indicated in the appended claims.

I claim.

1. Apparatus for forming a composite mat of moldable materials, wherein discrete shaped portions provide indicia in bas-relief, comprising:
 (a) a sectionalized mold including a main mold section with a bottom surface surrounding a recess opening therein;
 (b) an auxiliary mold section including an insert positioned in said recess through said opening and retained therein against lateral movement, said insert having at least one discrete indicia forming mold cavity extending below said bottom surface, said cavity having a top opening for receiving a first moldable material into the cavity to preform the indicia therein;
 (c) said main section being adapted to receive a second moldable material therein overlying said bottom surface and insert, and in bonding engagement with the upper exposed surface of the preformed indicia; and
 (d) said insert comprising a plate member having peripheral edges for abutment against contiguous confronting edges, and means providing an edge cavity along the periphery of the plate between the abutting edges, said cavity being spaced below the plane of the upper surface of the plate so as to leave an edge portion for shearing moldable material which may enter between the confronting edges, when the molded mat is removed from the mold.

2. Apparatus according to claim 1 in which said edge cavity comprising a groove extending lengthwise thereof, said groove having a side opening into the edge surface, and being of a width less than the width of the edge surface.

3. Apparatus according to claim 1 including a plurality of said inserts in which the inserts comprise plate members having edges for abutment with edges of adjacent plate members and with adjacent edges of the main section recess, at least one of each of the engaged abutment edges having said edge cavity extending longitudinally thereof.

References Cited

UNITED STATES PATENTS

| 1,261,543 | 4/1918 | Jackson | 249—103 |
| 1,337,493 | 4/1920 | Volz | 249—103 X |
| 2,546,085 | 3/1951 | Briscoe et al. | 18—48 |
| 1,487,847 | 3/1924 | Glatz et al. | 249—103 |
| 915,287 | 3/1909 | Haase | 249—103 |

J. SPENCER OVERHOLSER, Primary Examiner

M. O. SUTTON, Assistant Examiner

U.S. Cl. X.R.

18—34, 44; 249—104